US006894696B2

United States Patent
Dawson

(10) Patent No.: US 6,894,696 B2
(45) Date of Patent: May 17, 2005

(54) METHOD AND APPARATUS FOR PROVIDING REFRACTIVE TRANSPARENCY IN SELECTED AREAS OF VIDEO DISPLAYS

(75) Inventor: Thomas Patrick Dawson, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 105 days.

(21) Appl. No.: 10/028,014

(22) Filed: Dec. 21, 2001

(65) Prior Publication Data

US 2003/0117410 A1 Jun. 26, 2003

(51) Int. Cl.[7] .............................................. G09G 5/00
(52) U.S. Cl. ...................... 345/582; 345/423; 345/587; 345/647; 345/660; 345/472; 382/255; 348/63
(58) Field of Search ............................. 345/472.2, 587, 345/646, 647, 648, 669, 671; 382/255; 348/63

(56) References Cited

U.S. PATENT DOCUMENTS

| 5,670,984 A | * | 9/1997 | Robertson et al. .......... 345/585 |
| 5,760,783 A | * | 6/1998 | Migdal et al. .............. 345/587 |
| 5,872,572 A | * | 2/1999 | Rossignac .................... 345/428 |
| 5,982,939 A | * | 11/1999 | Van Hook ................... 382/255 |
| 6,005,583 A | | 12/1999 | Morrison |
| 6,057,850 A | | 5/2000 | Kichury |
| 6,157,386 A | | 12/2000 | Wilde |
| 6,191,793 B1 | * | 2/2001 | Piazza et al. ................ 345/582 |
| 6,259,462 B1 | | 7/2001 | Gruber et al. |
| 6,283,857 B1 | | 9/2001 | Miyamoto et al. |
| 6,563,508 B1 | * | 5/2003 | Oka ............................ 345/586 |
| 6,572,476 B2 | * | 6/2003 | Shoji et al. .................... 463/33 |

* cited by examiner

Primary Examiner—Matthew C. Bella
Assistant Examiner—Antonio Caschera
(74) Attorney, Agent, or Firm—Blakely, Sokoloff, Taylor & Zafman LLP

(57) ABSTRACT

In a selected area of a display defined by a polygon, magnifying is simulated. The selected area may be, for example, a circle simulating a magnifying glass. Textures are represented by texel coordinates U and V, which specify the location of color components within a set of image data. Within the area selected to appear magnified, the present invention perturbs the texel location selection to simulate an angle of refraction in the selected area and offset texel coordinates.

12 Claims, 5 Drawing Sheets

METHOD AND APPARATUS FOR PROVIDING REFRACTIVE TRANSPARENCY IN SELECTED AREAS OF VIDEO DISPLAYS

FIELD OF INVENTION

The present invention relates to computer graphics and more particularly to efficiently simulate refraction through a magnifier in a computer display.

BACKGROUND OF THE INVENTION

There is a continuing quest for visual realism in computer entertainment. The two-dimensional surface of a computer display is utilized to display three-dimensional effects. Pixels are made to portray real objects and are used to produce special effects. The image is often composed from textured polygons. A wallpaper, pattern or other effect is applied to the polygons being rendered in the scene. The pixels are derived from rendering three-dimensional data.

In computer graphics, existing texture-rendering techniques map a pixel on a screen (typically using screen coordinates (x, y)) to a polygon, such as a triangle, on a surface in a viewing plane (typically using geometric or surface coordinates (s, t)). The polygon is rasterized into a plurality of smaller pieces called fragments. Each polygon may have information, such as color and/or a normal vector, associated with each vertex of the polygon. To assign a texture (i.e., a color pattern or image, either digitized or synthesized) to a fragment, the fragment is mapped onto a texture map (typically using texture coordinates (u, v)). A texture map represents a type of image, such as stripes, checkerboards, or complex patterns that may characterize natural materials. Texture maps are stored in a texture memory. A texture map comprises a plurality of texels. A texel is the smallest graphical element in a 2-D texture map used to render a 3-D object. A texel represents a single color combination at a specific position in the texture map.

Each texture map has a plurality of associated MIP (multi in parvum) maps, which are abbreviated versions of a full texture map. One of the MIP maps may be selected to provide a suitable resolution for the fragment of the polygon being rasterized. Several techniques exist to interpolate the desired color information from one or more MIP levels. These texel selection techniques are known technology. The final texture color derived from the selected MIP map is applied onto the fragment. The applied texture may be blended with a color already associated with the fragment or polygon.

In computer entertainment, a two-dimensional surface of a computer display is used to display three-dimensional graphics. This is done by supplying information to individual pixels comprising the display. Real objects are portrayed and special effects are used. In order to portray a realistic view of three-dimensional objects, it is necessary to provide a geometrical description of those objects. In order to simplify the description of an object surface, the three-dimensional object is resolved into a representation by polygons. The smooth surface of a curved object is resolved into a faceted surface of polygons. Generally, the polygon used is the triangle. Triangles provide a number of advantages, particularly having vertices which are of necessity co-planar.

Data is collected characterizing points defining vertices of the triangles for rendering a two-dimensional screen image of three-dimensional objects. Each vertex has a local normal, a line projecting perpendicularly from the three-dimensional surface. An eye point is selected relative to a plane of projection. A line from the eye point to the vertex forms an "eye point δ angle" with the local normal, which is resolved into x–z and y–z angles. In effect, the intersection of the line from the eye point through the plane of projection defines the pixels(s) at which the vertex appears in the two-dimensional display.

One prior art special effect is establishing a selected area and creating the effect that is a transparent panel through which the image is seen. One prior art technique blends colors of a selected area with colors whatever is to appear behind them. One special effect that has not been provided in consumer products is 3-D rendering to create a magnifying (or magnifying by a factor of less than one) through an area of interest. An area of interest may be a circle representing a simulated magnifying glass. Some prior art ray tracing systems have provided this effect. However, ray tracing systems are complex and are not usable practically as a viable consumer product due to their expense.

SUMMARY OF THE INVENTION

In accordance with the present invention, a method and apparatus are provided in which polygons in a selected area of a display is provided with the special effect of distortion as produced by thick glass or lens. The selected area may be, for example, a circle simulating a magnifying glass. Textures are represented by texel coordinates U and V, which specify the location of color components within a set of image data. Within the area selected to appear magnified, the present invention perturbs the texel location selection to simulate an angle of refraction in the selected area. This is most conveniently and efficiently done during the texturing operation. The scene may also be animated through a rendering of a real-time sequence of images appearing to be shown through a magnifying glass by re-mapping a different portion of the texture in each frame. Optionally, prior to rendering the polygons within the simulated magnifying glass area, the content of the frame buffer could be captured and used as a texture and the refraction effect could then be applied to the entire capture frame.

BRIEF DESCRIPTION OF THE DRAWINGS

The invention, both as to its organization and manner of operation, may be further understood by the following description taken in connection with the following drawings.

Of the drawings.

DETAILED DESCRIPTION OF THE INVENTION

Figure 1:
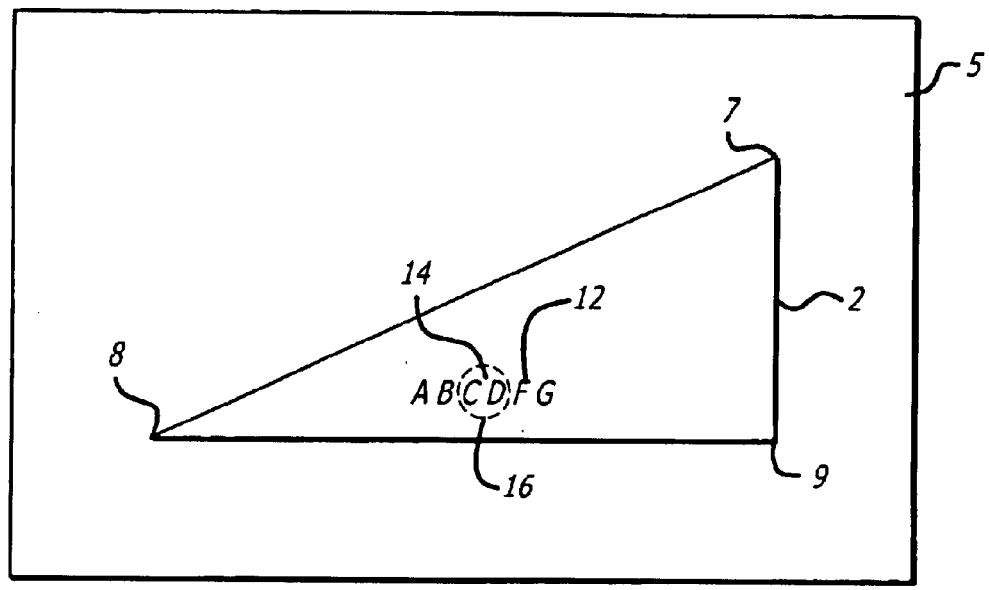
FIG. 1 is an illustration of a display simulating the prior art effect of viewing a selected area of a display, the area being defined by a "transparent" polygon.

FIG. 1 is an illustration of a polygon 2 displayed on a computer display 5. The polygon 2 in the present example is a triangle defined by vertices 7, 8 and 9. The polygon 2, for purposes of illustration, contains text 12. For simplicity of description and illustration, a single polygon 2 is illustrated. In accordance with general practice, the polygon 2 is selected to be a triangle. Normally, in rendering, a large number of polygons 2 represent a surface. They are not normally discernable as triangles. In the present description, the single, large polygon 2 is illustrated. A selected area 14 of the display 5 is selected in which a special effect is provided. In accordance with the present invention, the selected area 14 corresponds to a polygon such as the polygon 2. The Polygon 2 could also comprise a set of polygons. In the present example, a set of polygons 2 approximates a circle 16. Alternatively a special effect could be provided for the whole display 5. In FIG. 1, no special effect is illustrated.

Figure 2:
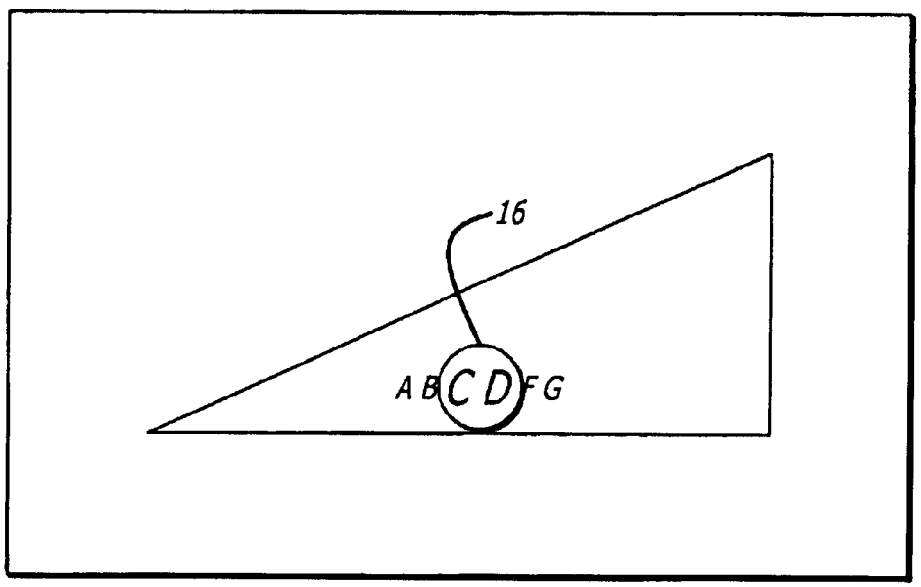
FIG. 2 is an illustration of the computer display of FIG. 1 in which the magnifying special effect is provided in the area enclosed in the "transparent polygon"

FIG. 2 is an illustration of the magnifying effect as provided in accordance with the present invention applied to the display 5 of FIG. 1. The circle 16 in the embodiment of FIG. 2 simulates a lens, which will generally be convex but could be concave.

Figure 3:
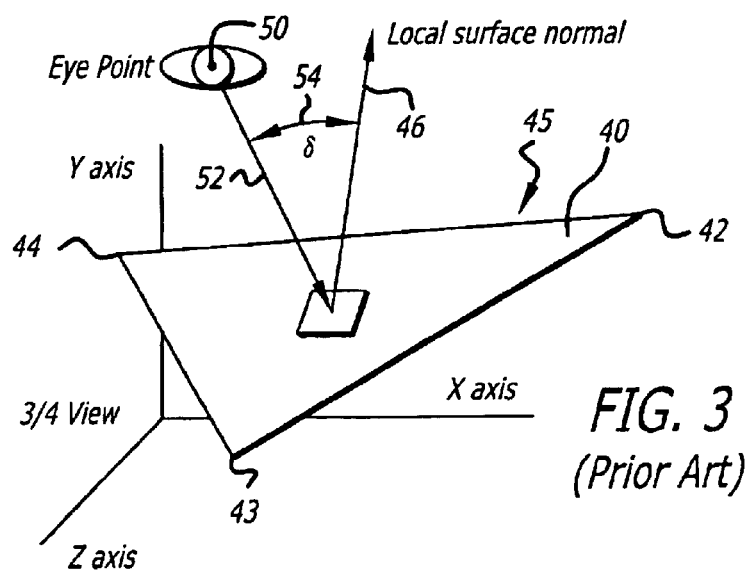
FIG. 3 is a ¾ view of a rendered polygon against x, y and z axes.
Figure 4:
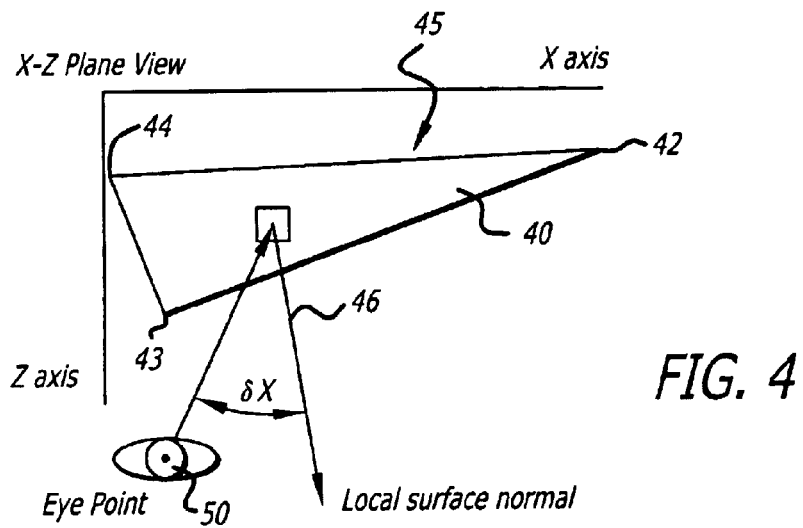
FIGS. 4 and 5 are views of the polygon of FIG. 3 illustrated in the X–Z plane and the Y–Z plane respectively.
Figure 5:
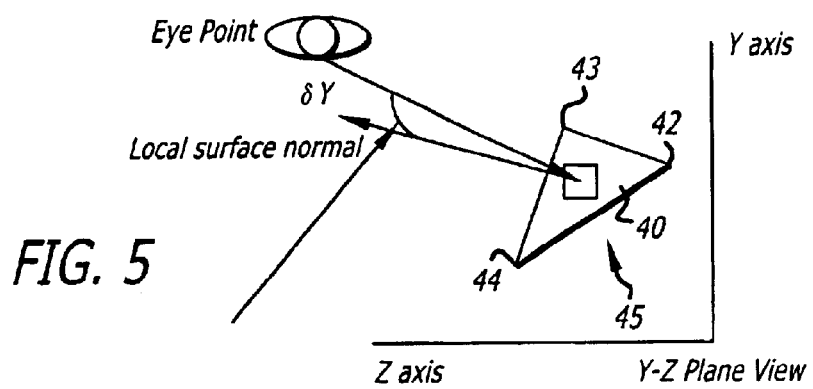

FIGS. 3, 4 and 5 are each a projection of a polygon 40 to be projected on a plane of projection corresponding to the display 5 (FIGS. 1 and 2). FIG. 3 is a ¾ view. More specifically, X and Y axes are orthogonal on the plane of the drawing sheet and the Z axis is illustrated as being projected at a 135° angle from the X and Y axes and coming out of the page. FIGS. 4 and 5 are X–Z plane and Y–Z plane views of the polygon 40 respectively. The polygon 40 is a triangle 40 defined by vertices 42, 43 and 44 in a plane 45. Orientation of the polygon 40 is characterized by a "local surface normal" 46. The local surface normal 46 which is normal to the planar surface of the polygon 40. The polygon 40 is viewed from an eye point 50. The eye point is a point in space from which a scene is viewed. It is the point in space from which the projections being illustrated are seen. In other contexts, the eye point 50 is also referred to as the camera point.

In order to illustrate orientation of an eye point 50 with respect to the local surface normal 46, a line segment 52 is illustrated connecting the eye point 50 to the origin of the surface normal 46 at the surface of the triangle 40. In this manner, an eye point δ angle 54 is defined in the ¾ view of FIG. 3. The angle 54 has a projection 55 in the X–Z plane in FIG. 3 and a projection 56 in the Y–Z plane of FIG. 4.

For a given scene, the eye point δ angle 54 with the surface normal is preferably established for each vertex 42, 43 and 44 during image rendering and then stored.

The present invention is utilized in conjunction with texture mapping. Texture mapping is the process of projecting a position on one plane onto another plane. Texture mapping is one way of providing a bit map image onto a rendered surface. This is the prior art application of texture mapping. A separate rendering process is to produce the textured image. In the present embodiment, a first plane corresponds to that of the polygon 40 and the second plane is the viewing surface of display 5. The planes may be in any position or orientation relative to each other in three dimensions. The projection calculations incorporate offset, rotation and perspective transformations.

Texture maps are bit maps composed themselves by pixels. Textures are, in general, generated as Multi in Parvam (MIP) maps. The color components within texture maps are referred to as texels to avoid confusion with screen pixels. While in the prior art and in the area of the display 5 outside of the circle 16, all textures on the polygon 40 are projected at the same in accordance with their stored eye point δ angle. However, for points within the same circle 16 to simulate the magnifying effect, the eye point δ angle 54 is perturbed. In other words, as seen in FIGS. 1 and 2, no change in the positions of the letters A, F and G occurs. However, in FIG. 2, the angle of projection of the letters B, C, D and E is changed. The letters C and D are made to appear larger, and the letters B and E are refracted so greatly they are not within the field of view of the magnified area, i.e. the selected area 14.

Figure 6:
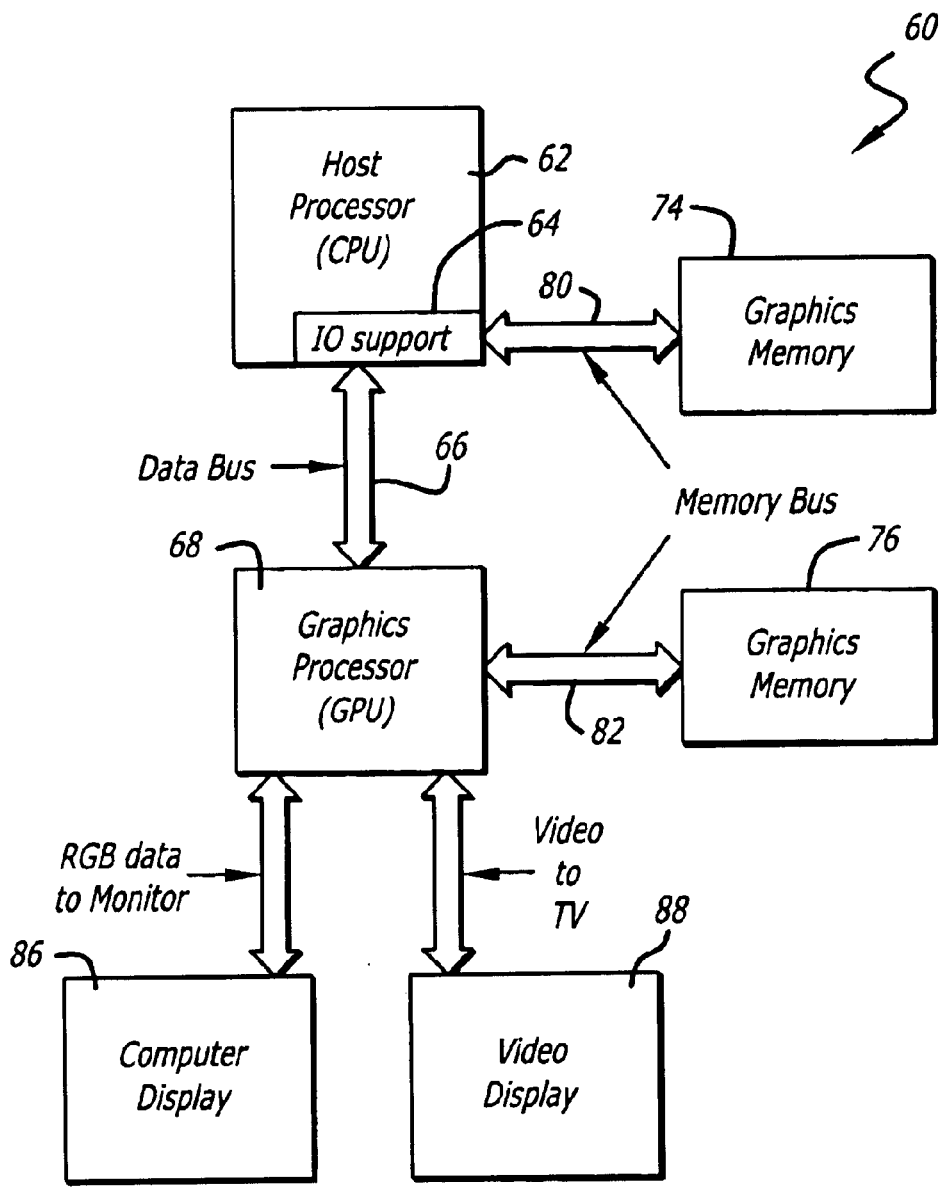
FIG. 6 is a block diagram of one form of processor performing the present invention.
Figure 7:
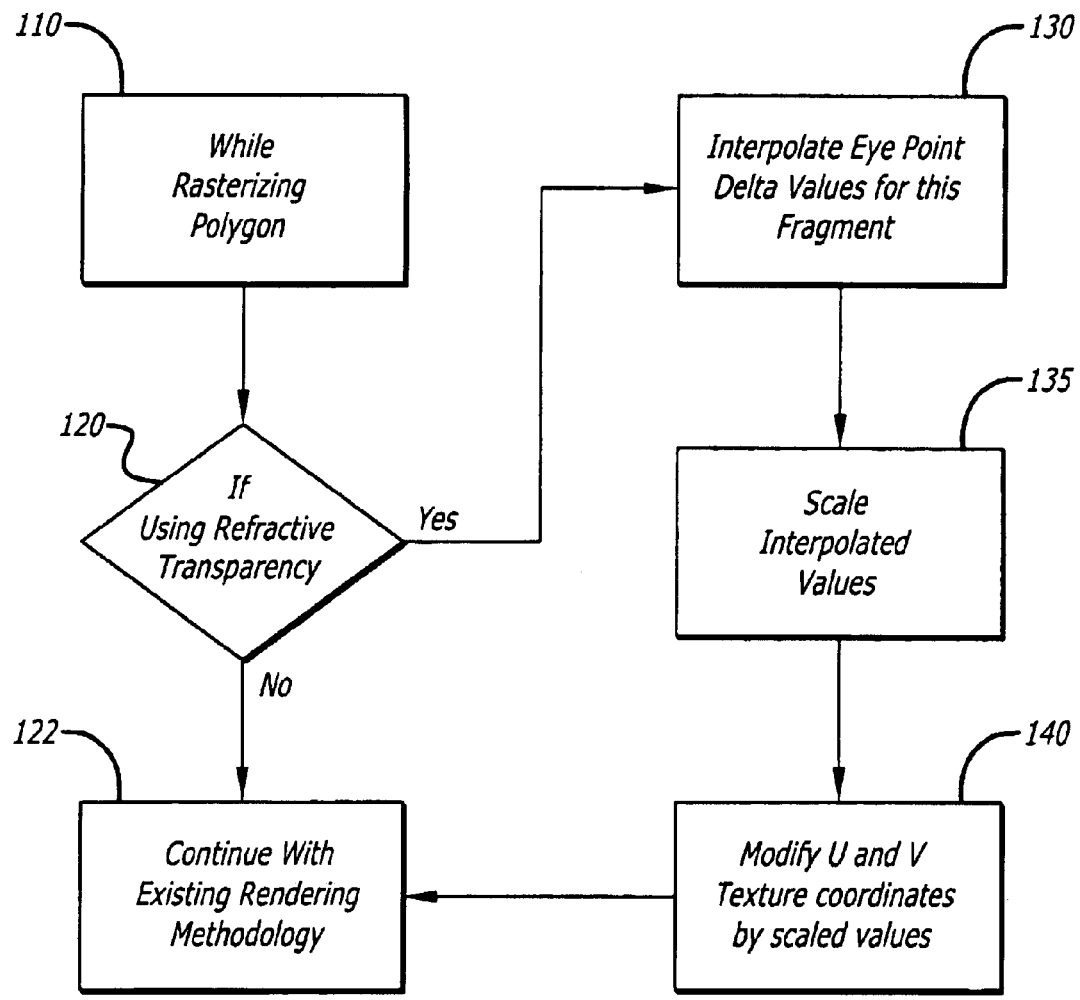
FIG. 7 is a flow chart illustrating operation of the present invention.

FIG. 6 is a block diagram of an image processing system 60 comprising the present invention. A host processor 62 includes an I/O (input/output) interface 64 and communicates via a data bus 66 to a graphics processor unit 68 (GPU 68). The host processor 62 has a host memory 74. The GPU 68 has a graphics memory 76. The memories 74 and 76 communicate with their respective processors 62 and 68 by respective memory buses 80 and 82. The graphics processor 68 may provide RGB data to a monitor 86 and/or a video display 88. In practice, the graphics processor unit 68 and the other associated components illustrated in FIG. 7 are typically implemented as a set of custom application specific integrated circuits (ASICs). The graphics processor 68 communicates with a device driver software program located on the host CPU 62 that provides an application programming interface (API) layer through which drawing commands can be passed over the bus 66 to the graphics processor 68. The device driver translates the APA drawing commences into data streams that are understood by ASICs residents on the graphics processor 68.

Rendering is achieved through what is referred to as the "graphics pipeline" illustrated in FIG. 7, the first step is to project geometry that describes the polygonal data onto a plane. At block 110, image data is accessed from the host memory 74 for rasterization of a polygon. Operation proceeds to block 120 where a determination is made as to whether refractive transparency, i.e., the magnification effect, will be applied to that polygon. If not, operation proceeds in accordance with existing rendering methodology at block 122. Polygon lighting calculations are also performed during this step. This process may be performed in the host CPU 62.

The accessed data comprises a particular number of geometric descriptions of a 3-dimensional polygon projected onto a two-dimensional plane. The two-dimensional plane represents the display screen 5 (interspersed with this data will be control through overall system settings such as ambient light value and other global attributes). The ASICs on the graphics processor 68 convert the transformed and lit geometric data into a set of fragment data through a process called rasterization. The fragment is a portion of a polygon that covers the area assigned to correspond to one pixel on the display. Subdividing polygon data into a set of fragment data where each fragment indicates the contribution of a polygon to a particular pixel, i.e. a display location on the display, is called rasterization.

If, at block 120 the magnification effect is selected to be provided, operation proceeds at block 130. All of the data associated with each vertex 42, 43 and 44 is interpolated across the fragment data as it is processed to provide the values at block 130. The eye point angle is angle is included as part of the data interpolated on a per fragment basis. The eye point angle is represented by eye point δx and eye point δy. These values are projected into the X–Z and Y–Z planes to produce the scalar eye point values in X and Y that are stored with the vertex data.

At block 135, multiplying is done using values obtained at block 130. This multiplication is performed for each polygon fragment. Many different particular mechanisms for multiplying are well known in the art. The eye point δ angle stored at each vertex can be pre-scaled by a constant factor N to modify the magnitude of the refractive effect. Offsetting the U and V values by the scale eye point δ angles is defined as:

$$U'=U+(N*(\text{eye point } \delta x \text{ angle}))$$

$$V'=V+$$

$$(N*(\text{eye point } \delta y \text{ angle}$$

N represents a means of controlling the effect to achieve the desired result. N<1 represents magnification. N>1 represents demagnification. The new U and V prime values are used to specify the texel location in the texture image to be used with the fragment. In performing calculations, actual angles values may be used, but it is most convenient to normalize and angular value to pre-selected linear displacement. As seen at block 140, texturing is next performed. For achieving the refracting effect, U and V coordinates associated with each fragment are modified by eye points values generated for that fragment. This step cannot be pre-processed to simply modify the U and V coordinates at each vertex by eye point values. The per fragment modification involves a non-linear relationship that cannot be interpolated between vertices. The non-linearity relates to the use of divide by w (or multiple by 1/w), which is a standard prior art function used in automatic perspective correction. At block 122, z buffering is provided. Z buffering comprises eliminating fragments that are occluded by those closer to the plane of projection. The contents of the z buffer are continuously scanned out to the video display or computer monitor.

Figure 8A:
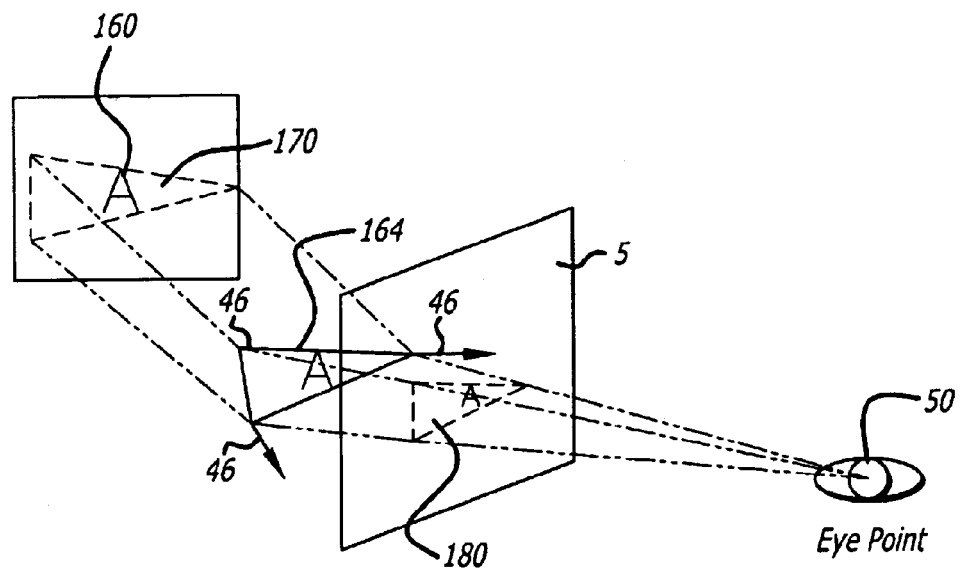
FIG. 8 is both a view of the polygon of FIGS. 1 and 2 projected onto a display at eye point δ angles and perturbed eye point δ angles.
Figure 8B:
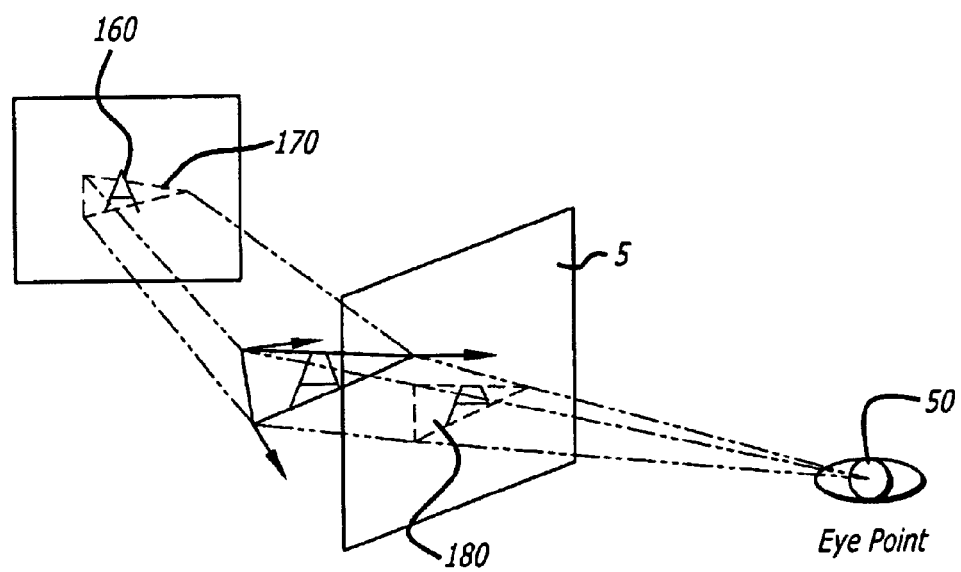

FIG. 8, comprising FIGS. 8*a* and 8*b*, is a view of stored image 160 to be mapped on to a polygon 164 and projected onto the display 5 without and with the magnification effect respectively. The same reference numerals are used to denote elements corresponding to those of FIGS. 3–5. In the present example, the image 160 is a letter A, and the polygon 164 is a triangle. In the cases of both FIGS. 8*a* and 8*b*, the image 160 is accessed from the memory and will be mapped as a texture on the polygon 164. In FIG. 8*b*, the modifying U and V coordinates according to eye point angle changes the part of the image 160 that is mapped on to the polygon 164 and seen in display 5 within the projection 180 of the polygon 170 on the display 5.

The specification has been written with a view toward enabling those skilled in the art to make modifications in the particular example illustrated in order to provide the magnification special effects in accordance with the present invention.

What is claimed is:

1. A method for rendering an image on a display and producing a special effect in the rendered image comprising:

selecting a set of polygon data to which to apply the special effect, the polygon data defining a polygon surface and having a polygon segment;

retaining an eye point δ angle within a vertex data passed to a graphics rendering pipeline, the eye point δ angle being formed with respect to a normal of the polygon surface;

perturbing the eye point δ angle at the polygon fragment; and incorporating a texel to the perturbed eye point δ angle, the texel having texel coordinates U and V;

wherein perturbing the eye point δ angle comprises multiplying the eye point δ angle by a value N, N being a constant factor modifying magnitude of the special effect, and providing a corresponding offset to each of the texel coordinates.

2. The method according to claim 1 wherein N<1 represents magnification and N>1 represents demagnification.

3. The method according to claim 1 wherein the offset is a product of the eye point δ angle and the value N.

4. The method according to claim 1 wherein retaining the eye point δ angle comprises accessing data for selected vertices describing a polygon and interpolating the eye point δ angle for the texel to be produced between texels including said vertices.

5. The method according to claim 4 further comprising resolving the eye point δ angle into eye point δ angle x in an X–Z plane and eye point δ angle y in a Y–Z plane.

6. The method according to claim 4 further comprising displaying texels in the selected polygon and selecting texels based on a modified U and V mapping derived through using eye point angles.

7. A machine-readable medium that provides instructions which, when executed by a processor, cause said processor to perform operations producing a special effect in a computer display comprising:

selecting a set of polygon data to which to apply the special effect, the polygon data defining a polygon surface and having a polygon segment;

retaining an eye point δ angle within a vertex data passed to a graphics rendering pipeline, the eye point δ angle being formed with respect to a normal of the polygon surface;

perturbing the eye point δ angle at the polygon fragment; and providing a texel to the perturbed eye point δ angle, the texel having texel coordinates U and V;

wherein the instructions causing said processor to perform perturbing comprises instructions which, when executed by a processor, cause said processor to perform operations comprising perturbing the eye point δ angle by multiplying the eye point δ angle by a value N, N being a constant factor modifying magnitude of the special effect.

8. The machine-readable medium according to claim 7 that provides instructions which, when executed by a processor, cause said processor to perform operations comprising accessing data for a set of vertices describing a polygon and interpolating the eye point δ angle for the texel to be produced between texels including said vertices.

9. The machine-readable medium according to claim 8 that provides instructions which, when executed by a processor, cause said processor to perform resolving the eye point δ angle into eye point δ angle x in an X–Z plane and eye point δ angle y in a Y–Z plane.

10. The machine-readable medium according to claim 8 that provides instructions which, when executed by a processor, cause said processor to perform operations comprising producing magnification for a selected area of said display by modifying the texel coordinates by offsetting them with the eye point δ angle x and the eye point δ angle y.

11. A graphics pipeline converting polygon data to display data comprising a processor to modify texel coordinates according to an eye point δ angle being perturbed at polygon fragments of the polygon data to allow a portion of a rendered image generated from the polygon data to have a special effect applied, the polygon data defining a polygon surface, the eye point δ angle being formed with respect to a normal of the polygon surface;

wherein said processor comprises a multiplier to multiply N with the eye point δ angle, N being a constant factor modifying magnitude of the special effect.

12. The graphics pipeline of claim 11 further comprising means applying the special effect only to selected polygons.

* * * * *